United States Patent
He et al.

(10) Patent No.: US 8,418,441 B2
(45) Date of Patent: Apr. 16, 2013

(54) SYSTEMS AND METHODS FOR CONTROLLING TEMPERATURE AND TOTAL HYDROCARBON SLIP

(75) Inventors: Suhao He, Painted Post, NY (US); Achim Karl-Erich Heibel, Corning, NY (US); Wenbin Qiu, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 445 days.

(21) Appl. No.: 12/786,758

(22) Filed: May 25, 2010

(65) Prior Publication Data

US 2010/0300070 A1    Dec. 2, 2010

Related U.S. Application Data

(60) Provisional application No. 61/182,390, filed on May 29, 2009.

(51) Int. Cl.
*F01N 3/00* (2006.01)
*F01N 3/10* (2006.01)

(52) U.S. Cl.
USPC .......... 60/286; 60/274; 60/295; 60/299; 60/303

(58) Field of Classification Search .......... 60/274, 60/286, 295, 299, 303, 311
See application file for complete search history.

(56) References Cited

U.S. PATENT DOCUMENTS

| | | | |
|---|---|---|---|
| 5,419,122 A | 5/1995 | Tabe et al. | 60/274 |
| 5,829,248 A | 11/1998 | Clifton | 60/286 |
| 6,202,406 B1 | 3/2001 | Griffin et al. | 60/274 |
| 6,968,682 B1 | 11/2005 | Leuz et al. | 60/311 |
| 7,062,907 B2 | 6/2006 | Kitahara | 60/295 |
| 7,111,455 B2 * | 9/2006 | Okugawa et al. | 60/295 |
| 7,137,248 B2 | 11/2006 | Schaller | 60/297 |
| 7,293,407 B2 | 11/2007 | Adler et al. | 60/286 |
| 7,337,607 B2 | 3/2008 | Hou et al. | 60/274 |
| 7,367,182 B2 | 5/2008 | Takahashi et al. | 60/286 |
| 2006/0213188 A1 | 9/2006 | Matsuno et al. | 60/286 |
| 2007/0130923 A1 | 6/2007 | Dye et al. | 60/295 |
| 2007/0199312 A1 | 8/2007 | Kapparos et al. | 60/297 |
| 2007/0220865 A1 | 9/2007 | Cunningham et al. | 60/286 |
| 2010/0050607 A1 | 3/2010 | He et al. | 60/286 |
| 2010/0050757 A1 * | 3/2010 | Liu et al. | 73/114.75 |

OTHER PUBLICATIONS

Birkby et al., "The Development and Testing of an Active Particulate Regeneration System Using Model Based Control", SAE 2006-01-3258, Oct. 16-19, 2006.

* cited by examiner

*Primary Examiner* — Kenneth Bomberg
*Assistant Examiner* — Audrey K Bradley
(74) *Attorney, Agent, or Firm* — Matthew B. McNutt

(57) ABSTRACT

Systems and methods for controlling temperature and total hydrocarbon slip in an exhaust system are provided. Control systems can comprise an oxidation catalyst, a particulate filter, a fuel injector, and a processor for controlling a fuel injection based on an oxidation catalyst model. Example system includes a virtual sensor comprising a controller for calculating and providing the total hydrocarbon slip to subsystems for after-treatment management based on modeling the oxidation catalyst. Example methods for controlling the temperature and the total hydrocarbon slip in an exhaust system include the steps of providing an oxidation catalyst model, monitoring a condition of the exhaust system, calculating a hydrocarbon fuel injection flow rate and controlling a fuel injection. The example methods further include the steps of determining an error in the oxidation catalyst model based on the monitored condition and changing the oxidation catalyst model to reduce the error.

9 Claims, 3 Drawing Sheets

SYSTEMS AND METHODS FOR CONTROLLING TEMPERATURE AND TOTAL HYDROCARBON SLIP

CROSS-REFERENCE TO RELATED APPLICATIONS

This application claims the benefit of priority to U.S. provisional application No. 61/182,390, filed on May 29, 2009.

BACKGROUND OF THE INVENTION

1. Field of the Invention

The present invention relates generally to systems and methods for controlling temperature and total hydrocarbon slip, and more particularly, to systems and methods for controlling temperature and total hydrocarbon slip of an exhaust system.

2. Technical Background

It is known to control the temperature within a particulate filter of a diesel engine exhaust system to regenerate the filter at a desired temperature. Known control systems for controlling the temperature may operate adequately under steady-state conditions. However, such systems may not provide acceptable control performance under various dynamic conditions, such as when engine speed and/or torque are dynamically changing.

SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In one example aspect, a method is provided for controlling an exhaust stream temperature at a point along an exhaust system. The exhaust system includes an oxidation catalyst, a particulate filter including an outlet, and a fuel injector for injecting fuel into an exhaust stream at a location upstream from the outlet of the particulate filter. The method includes the steps of providing an oxidation catalyst model, monitoring a condition of an exhaust stream, and calculating a hydrocarbon fuel injection flow rate for the fuel injector based on the oxidation catalyst model. The method further includes the step of controlling an operation of the fuel injector based on the calculated hydrocarbon fuel injection flow rate, to control the exhaust stream temperature at the point along the exhaust system. The method still further includes the steps of determining an error in the oxidation catalyst model based on the monitored condition, and changing the oxidation catalyst model to reduce the error.

In another example aspect, a method is provided for controlling a total hydrocarbon slip exiting an exhaust system. The exhaust system includes an oxidation catalyst, a particulate filter including an outlet, and a fuel injector for injecting fuel into an exhaust stream at a location upstream from the outlet of the particulate filter. The method comprises the steps of providing an oxidation catalyst model, monitoring a condition of the exhaust stream, calculating a post fuel injection flow rate, and calculating a limiting total hydrocarbon slip flow rate based on the oxidation catalyst model. The method further includes the step of controlling an operation of the fuel injector at a hydrocarbon fuel injection flow rate based on a smaller one of the post fuel injection flow rate and the limiting total hydrocarbon slip flow rate, to control the total hydrocarbon slip exiting the exhaust system. The method further includes the steps of determining an error in the oxidation catalyst model based on the monitored condition, and changing the oxidation catalyst model to reduce the error.

In still another example aspect, a control system is provided for an exhaust system. The control system includes an oxidation catalyst, a particulate filter including an outlet, and a fuel injector for injecting fuel into an exhaust stream at a location upstream from the outlet of the particulate filter, wherein the exhaust stream flows through the particulate filter. The exhaust system further includes a processor for controlling an operation of the fuel injector based on an oxidation catalyst model. The processor is programmed to monitor a condition of the exhaust stream, control a hydrocarbon fuel injection flow rate based on the oxidation catalyst model to control a total hydrocarbon slip exiting the exhaust system, and control the operation of the fuel injector to control an exhaust stream temperature at a point along the exhaust system. The processor is further programmed to determine an error in the oxidation catalyst model based on the monitored condition of the exhaust system, and change the oxidation catalyst model to reduce the error.

In yet another example aspect, a virtual sensor for an exhaust system is provided. The virtual sensor comprises a controller having an input. The controller is configured to monitor a condition of the exhaust system through the input. The controller is also configured to model an oxidation catalyst of the exhaust system based on the monitored condition, and calculate a total hydrocarbon slip for the exhaust system based on a result of modeling the oxidation catalyst.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
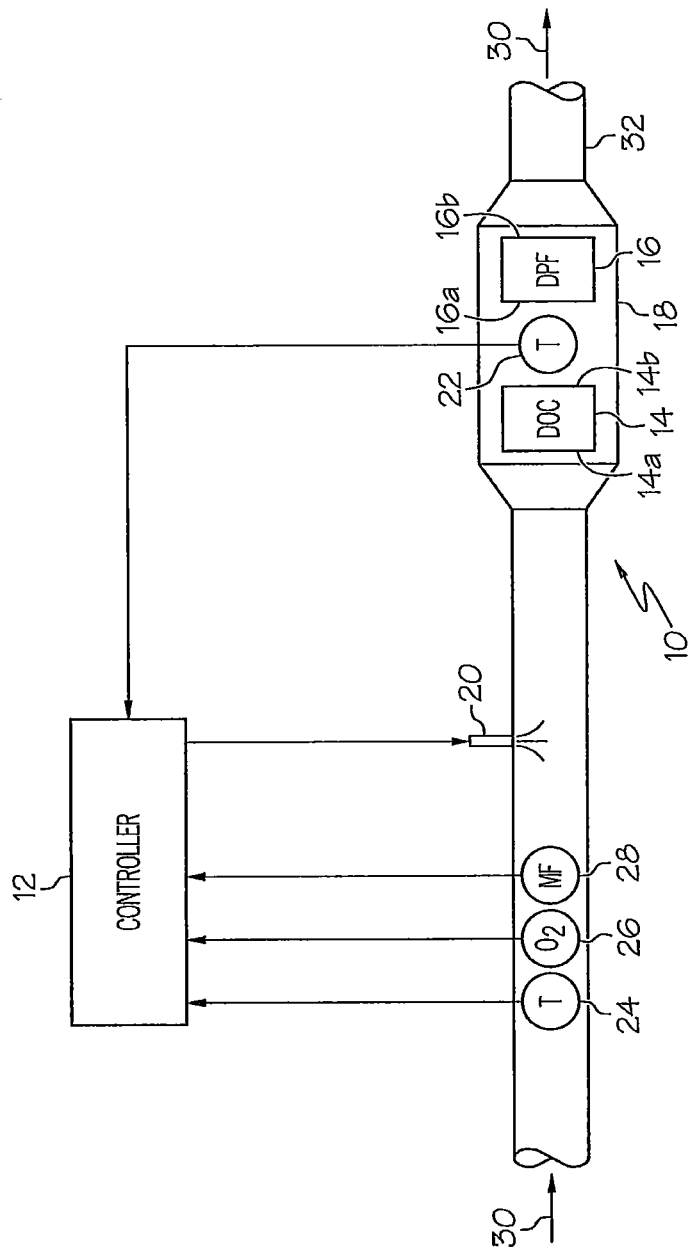
FIG. 1 is a schematic diagram of a portion of an exhaust system and a controller for the exhaust system.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods, and materials may be omitted so as not to obscure the description of the present invention. Finally, wherever applicable, like reference numerals refer to like elements.

An example system for controlling temperature and total hydrocarbon (THC) slip of an exhaust system 10 is shown in FIG. 1. The exhaust system 10 can include a diesel oxidation catalyst (DOC) 14, a diesel particulate filter (DPF) 16, and a fuel injector 20 for injecting fuel into an exhaust stream 30. The control system includes a controller 12 and various sensors 22, 24, 26, 28 at a location along the exhaust system 10 to monitor one or more conditions of the exhaust stream 30.

In example embodiments, the exhaust system 10 carries the exhaust stream 30 from an internal combustion engine (not shown), such as a diesel engine. It is to be appreciated that the engine does not need to be a diesel engine, and could be another type of internal combustion engine, such as a gasoline engine, for example. Nevertheless, the following description refers to a diesel system and controls for a diesel system for ease of explaining example embodiments, but it is understood that other (i.e., non-diesel) systems may be similarly controlled.

The exhaust system 10 includes the DOC 14, which can be included within a catalytic converter. The exhaust system 10 further includes the DPF 16 for filtering particulates from the exhaust stream 30 before the exhaust stream 30 is discharged through a tailpipe 32 into the atmosphere. Various types of DPF 16 can be used in accordance with the present invention. In one example, the DPF 16 can comprise porous ceramic honeycomb filters. It is useful to periodically clean out, i.e., "regenerate", the DPF 16 by removing accumulated particles that have been filtered by the DPF 16. In a diesel after-treatment system, the DPF 16 can be regenerated by burning the accumulated particulates out of the DPF 16 by controlling the temperature of the exhaust stream 30. However, care should be taken so that the DPF 16 is not overheated to a point at which damage occurs. For example, too high of a regeneration temperature can cause cracks within the DPF 16 or reduce filtration efficiency and lifetime.

Example regeneration temperatures can be between 550° C. and 650° C., although temperatures below and above that range are also contemplated. Under normal operating conditions, the temperature of the exhaust stream 30 may not be hot enough to initiate and sustain a complete DPF 16 regeneration. Therefore, the exhaust system 10 can include the DOC 14 located near the DPF 16 to heat the exhaust stream 30. In FIG. 1, the DOC 14 can have an inlet 14a that is connected to the upstream exhaust system 10, and an outlet 14b. The outlet 14b of the DOC 14 can communicate with an inlet 16a of the DPF 16, which has an outlet 16b to the atmosphere. The DOC 14 and the DPF 16 can be provided within a common housing 18. It is to be appreciated that the DOC 14 and the DPF 16 can be formed as a single catalyzed filter.

In certain applications, such as heavy or light duty diesel applications, supplemental fuel can be injected. For example, a fuel injector can be provided by way of an in-cylinder injection configured to be located upstream from the DOC 14. In another example, as shown schematically in FIG. 1, the controller 12 controls the operation of the fuel injector 20 and, more specifically, the rate (e.g., mass flow rate, volumetric flow rate, etc.) at which hydrocarbon (HC) fuel is injected in the exhaust stream 30 by the fuel injector 20. The fuel injector 20 for injecting HC fuel into an exhaust stream 30 can be located upstream from the DOC 14 and DPF 16. The supplemental HC fuel is oxidized within the DOC 14, which heats the exhaust stream 30. It is to be appreciated that the fuel injector 20 can be operatively connected to a fuel source, such as the HC fuel source of the engine. By controlling the rate at which supplemental HC fuel is injected into the exhaust stream 30, the controller 12 can control the temperature of the exhaust stream 30 downstream from the DOC 14. Therefore, the controller 12 can control regeneration temperature within the DPF 16 and also control the THC slip exiting the exhaust system 10 by controlling the operation of the fuel injector 20.

As shown in FIG. 1, one or more sensors 22, 24, 26, 28 located along the exhaust system 10 can be used to provide the condition of the exhaust stream 30 to the controller 12. A first temperature sensor 22 can obtain the temperature $T_{out}$ of the exhaust stream 30 within or immediately downstream from the DOC 14. The controller 12 can be configured to monitor the temperature $T_{out}$ of the exhaust stream 30 that enters DPF 16 via an output from the first temperature sensor 22. A second temperature sensor 24 can also be provided to obtain the temperature $T_{in}$ of the exhaust stream 30 at a location upstream from the DOC 14. The controller 12 can be designed to monitor the exhaust stream temperature, prior to heating with the DOC 14, via the second temperature sensor 24. An oxygen sensor 26 and mass flow sensor 28 can provide the oxygen concentration $C_{O2}$ of the exhaust stream 30 and the mass flow $\dot{m}_{exh}$ of the exhaust stream 30, respectively, to the controller 12. It is to be appreciated that one or more of the conditions monitored by the controller 12 via the sensors 22, 24, 26, 28 can be calculated or estimated by the controller 12, and that the sensors could be mounted at various alternative locations along the exhaust system 10.

Figure 2:
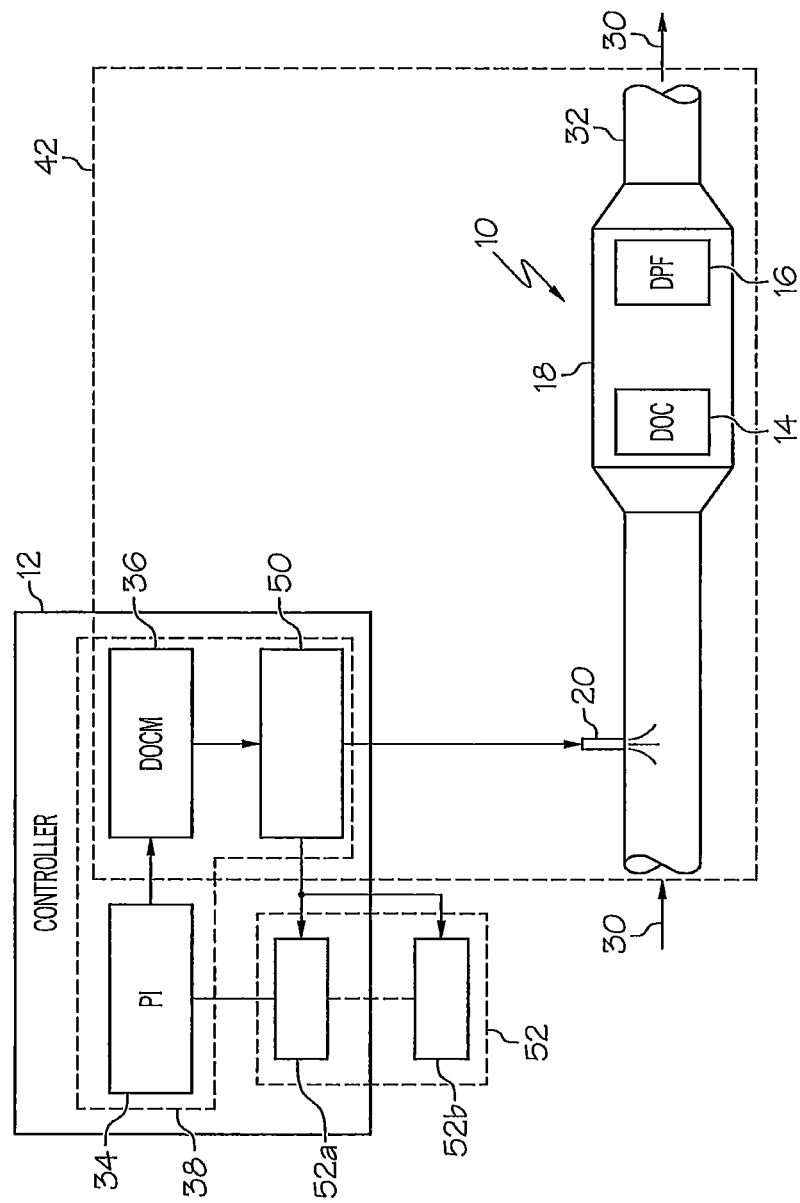
FIG. 2 is a schematic diagram of a portion of the exhaust system and a controller for the exhaust system.

A more detailed example of the system for controlling temperature and THC slip of the exhaust system 10 is shown in FIG. 2. Referring to FIG. 2, the controller 12 includes a generic model control (GMC) controller 38 and an integrated subsystem 52a for after-treatment management. The GMC controller 38 can comprise a control portion having a proportional gain and an integral gain (e.g., PI controller 34) and another control portion that provides a DOC model 36 (DOCM) and a THC slip controller 50. Subsystems 52 for after-treatment management can include the integrated subsystem 52a inside the controller 12 or a separated subsystem 52b outside the controller 12, which is embodied in a separated controller.

The operation of the exhaust system 10 is nonlinear, and the PI controller 34 alone, without the DOC model 36, may be unable to adequately control the regeneration temperature of the DPF 16, due to the nonlinearity of the system. However, the GMC methodology places the DOC model 36 of a portion of the exhaust system 10 into the control structure. For example, the DOC model 36 could model the nonlinear behavior of the DOC 14. The DOC model 36 tends to cancel the nonlinearity existing in the exhaust system 10. The approximated linear system 42 can be seen in FIG. 2. Linear control techniques can be applied to the approximated linear system 42. Example linear control techniques include PI control, proportional-integral-derivative (PID) control, and the like.

Figure 3:
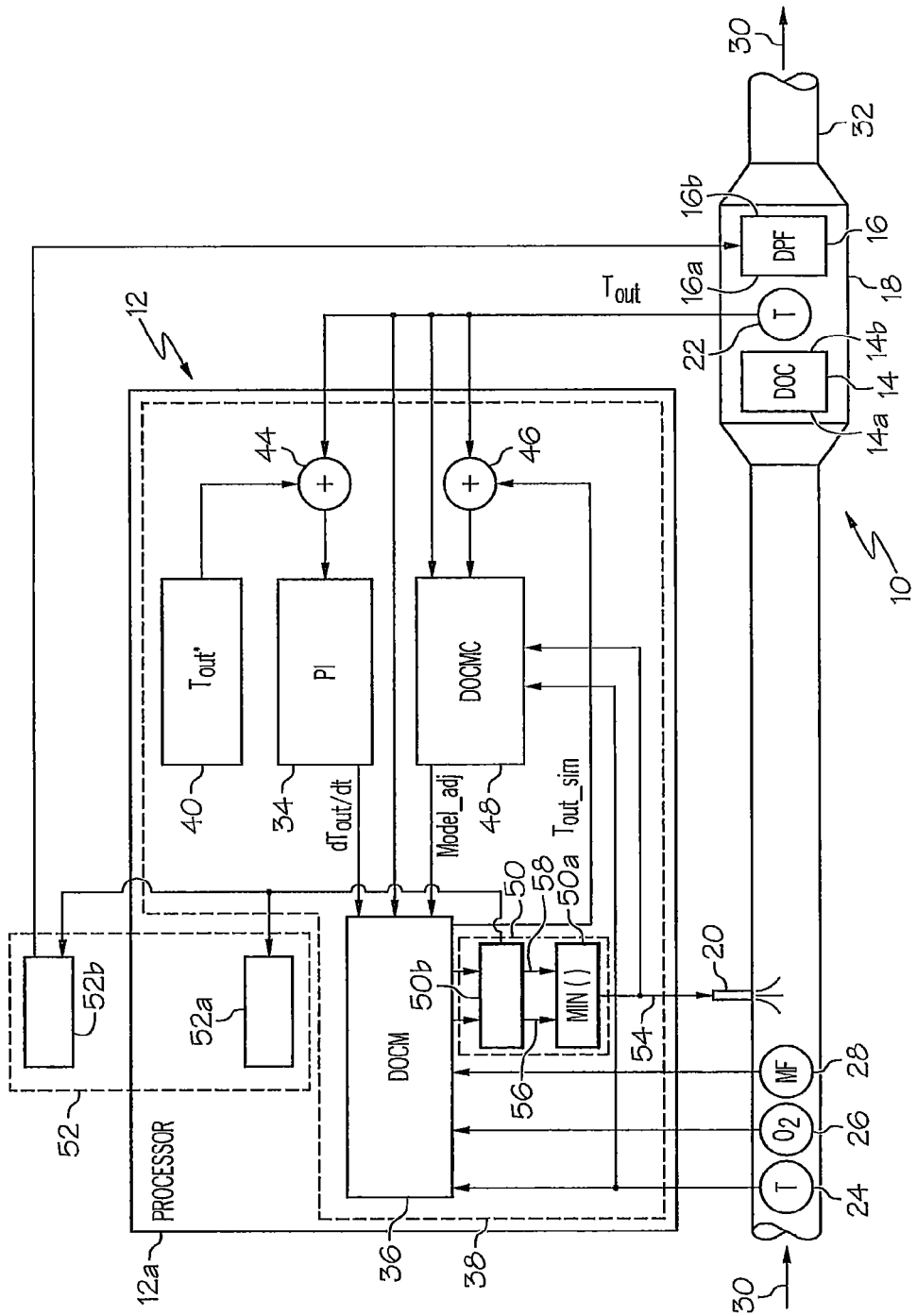
FIG. 3 is a schematic diagram of a portion of the exhaust system and a processor for the exhaust system.

Turning to FIG. 3, the controller 12 can be an electronic controller and can include a processor 12a. The controller 12 can include one or more of a microprocessor, a microcontroller, a digital signal processor (DSP), an application specific integrated circuit (ASIC), a field-programmable gate array (FPGA), discrete logic circuitry, or the like. The controller 12 can further include memory and can store program instructions that cause the controller 12 to provide the functionality ascribed to it herein. The memory can include one or more volatile, non-volatile, magnetic, optical, or electrical media, such as read-only memory (ROM), random access memory (RAM), electrically-erasable programmable ROM (EEPROM), flash memory, or the like. The controller 12 can further include one or more analog-to-digital (A/D) converters for processing various analog inputs to the controller. The controller 12 can also be integrated into an engine control unit (ECU).

Referring to FIG. 3, a specific embodiment of a GMC controller 38 of the controller 12 is shown in detail. Compared to FIG. 2, besides the PI controller 34, DOC model 36, and THC slip controller 50, the GMC controller 38 in FIG. 3 can further include a target temperature $T_{out}^*$ 24, a first summer 44, a second summer 46, and a DOC model controller 48 (DOCMC). The THC slip controller 50 can further comprise a comparator 50a and a THC slip calculator 50b.

The GMC controller 38 of the controller 12 determines the appropriate HC fuel injection flow rate 54 $\dot{m}_{hc}$ and, therefore, controls the temperature and THC slip of the exhaust system 10. The controller 12 is configured to model the DOC 14 based on the monitored conditions through one or more sensors 22, 24, 26, 28.

In one example embodiment, the fuel injector 20 is operated by an actual HC fuel injection flow rate 54 $\dot{m}_{hc}$. In order to obtain the actual HC fuel injection flow rate 54 $\dot{m}_{hc}$, a post fuel injection flow rate 56 $\dot{m}_{pi}$ is first determined based on the target temperature 40 $T_{out}^*$ for the DOC outlet 14b, the observed DOC outlet 14b temperature $T_{out}$, and DOC inlet 14a conditions ($C_{O2}$, $\dot{m}_{exh}$, and $T_{in}$). A first summer 44 receives the signals of $T_{out}^*$ and $T_{out}$, and determines a current control error $T_{out}^*-T_{out}$. The current control error $T_{out}^*-T_{out}$ is an input to the PI controller 34. Based on the current control error $T_{out}^*-T_{out}$ between the target temperature 40 $T_{out}^*$ and the observed DOC outlet 14b temperature $T_{out}$, the PI controller 34 calculates the required time derivative of the control variable (i.e., $dT_{out}/dt$) for the next control step to be performed by the DOC model 36. The PI controller 34 calculates $dT_{out}/dt$ and outputs $dT_{out}/dt$ to the DOC model 36. The DOC model 36 determines the appropriate post fuel injection flow rate 56 $\dot{m}_{pi}$ and outputs it to the comparator 50a of the THC slip controller 50. The DOC model 36 can also output a limiting THC slip $Slip_{lim}$ to the THC slip calculator 50b of the THC slip controller 50. The limiting THC slip $Slip_{lim}$ is applied to calculate the limiting THC slip flow rate 58 $\dot{m}_{pi,lim}$ by the THC slip calculator 50b. The limiting THC slip flow rate 58 $\dot{m}_{pi,lim}$ outputted by the THC slip calculator 50b is applied as an input to the comparator 50a. The actual HC fuel injection flow rate 54 $\dot{m}_{hc}$ is the output of the comparator 50a, and is the smaller one of the post injection flow rate $\dot{m}_{pi}$ and the limiting THC slip flow rate 58 $\dot{m}_{pi,lim}$. A corresponding control signal of the HC fuel injection flow rate 54 $\dot{m}_{hc}$ is sent to the fuel injector 20 for controlling its operation.

In an example embodiment, the calculated post fuel injection flow rate 56 $\dot{m}_{pi}$ can be directly sent from the DOC model 36 to the fuel injector 20 without passing through the THC slip controller 50. In this case, the HC fuel injection flow rate 54 $\dot{m}_{hc}$ is the same as the post fuel injection flow rate 56 $\dot{m}_{pi}$, and the controller 12 only controls the temperature in the exhaust stream 30 and DPF 16 but does not control the THC slip exiting the exhaust system 10.

In another example embodiment, when the controller 12 controls both the temperature and the THC slip of the exhaust stream 30, a virtual sensor for the exhaust system 10 is provided, wherein the output of the virtual sensor is the THC slip calculated by the DOC model 36 and the THC slip controller 50. Referring to FIG. 3, the virtual sensor comprises the controller 12 with one or more inputs, such as the first temperature sensor 22, the second temperature sensor 24, the oxygen sensor 26, and the mass flow sensor 28. The controller 12 is configured to monitor a condition of the exhaust system 10 by way of the one or more input sensors 22, 24, 26, 28. The condition can include temperatures at various alternative locations along the exhaust system 10, oxygen concentration, or mass flow of the exhaust stream 30. The controller 12 is also configured to model the DOC 14 based on the monitored conditions and a plurality of other parameters. The controller 12 is further configured to calculate the THC slip for the exhaust system 10 by the THC slip controller 50 based on the result of DOC model 36.

Moreover, as shown in FIG. 3, the controller 12 is configured to provide the THC slip as outputs to subsystems 52. The subsystems 52 can comprise various after-treatment management subsystems including a DPF 16 management subsystem, a selective catalyst reduction (SCR) management subsystem, or a lean $NO_x$ trap (LNT) management subsystem. The THC slip from the virtual sensor can be used to estimate THC absorption into the downstream catalyst, or as an input to DPF active regeneration calculation, or as the tailpipe 32 THC emission if no catalyst is used downstream of DOC 14. The subsystems 52 can include an integrated subsystem 52a as a part of the controller 12, or can include a separated subsystem 52b as a dedicated controller. In one example, the DPF management subsystem 52b is apart from the controller 12 while its input is connected to the THC slip calculator 50b to obtain the THC slip, and its output is connected to the DFP 16 for DPF active regeneration calculation.

In example embodiments, the controller 12 can further determine an error in the DOC model 36 based on the monitored condition of the exhaust system 10, and thus, change the DOC model 36 to reduce the error based on an open-loop adjustment parameter and a closed-loop adjustment parameter.

The open-loop adjustment parameter reflects the degradation of the DOC 14, and can be modeled by an expression:

$$-\frac{dk}{dt} = Ak^b \qquad (1)$$

where k is a reaction rate constant, t is time, and A and b are constants.

As shown in FIG. 3, Model_adj is the closed-loop adjustment parameter that is used to adjust the HC fuel injection flow rate 54 $\dot{m}_{hc}$ to compensate for exhaust system 10 dynamics not captured in the DOC model 36, such as sensor drift. As shown in FIG. 3, a second summer 46 receives the observed DOC outlet 14b temperature $T_{out}$ and an estimated DOC outlet 14b temperature $T_{out\_sim}$. $T_{out\_sim}$ is an expected DOC outlet 14b temperature and is estimated from the DOC model 36. The second summer 46 determines $T_{out}-T_{out\_sim}$, which is provided to the DOC model controller 48. The DOC model controller 48 further receives the signal $T_{in}$ provided by the second temperature sensor 24, and HC fuel injection flow rate 54 $\dot{m}_{hc}$. The DOC model controller 48 determines a value for Model_adj, which is provided to the DOC model 36.

Example methods for controlling temperature and THC slip in accordance with aspects of the present invention will now be described. In example embodiments, methods can comprise the steps of providing the DOC model 36.

The primary chemical reaction that occurs within the DOC 14 is:

$HC+O_2 \rightarrow CO_2+H_2O+\Delta H$ where HC represents the hydrocarbons introduced into the exhaust stream 30 via the fuel injector 20, and $\Delta H$ represents the heat released by the reaction. The heat released by the reaction $\Delta H$ raises the temperature of the exhaust stream 30 to regenerate the DPF 16. A continuous stirred tank reactor (CSTR) model can be used to capture the thermodynamics of the primary chemical reaction. The CSTR model can be generically expressed in the following format:

$$\frac{dT_{out}}{dt} = f(T_{out\_last}, C_{O2}, \dot{m}_{exh}, T_{in}, \dot{m}_{hc}) \quad (2)$$

where $T_{out}$ is the DOC outlet 14b temperature, $T_{out\_last}$ is a DOC outlet 14b temperature in the last (i.e. previous) control step, $C_{O2}$ is the oxygen concentration in the exhaust stream 30, $\dot{m}_{exh}$ is the mass flow rate of the exhaust stream 30, $T_{in}$ is the DOC inlet 14a temperature, and $\dot{m}_{hc}$ is the HC fuel injection flow rate 54. It is to be appreciated from equation (2) above that the rate of change of the DOC outlet 14b temperature $dT_{out}/dt$ can be approximately expressed as a function of the DOC outlet 14b temperature in the last control step $T_{out\_last}$ and the DOC inlet 14a conditions ($C_{O2}$, $\dot{m}_{exh}$, $T_{in}$, and $\dot{m}_{hc}$). $dT_{out}/dt$ can be calculated by the PI controller 34 in the GMC controller 38 and sent to DOC model 36 as one of the plurality of parameters of the DOC model 36 for the purpose of providing the DOC model 36.

It is to be appreciated that the PI controller 34 used in the GMC controller 38 has a different output than a PI controller found in conventional control systems. In a conventional control system, a PI controller would directly determine the manipulated variable, such as the HC fuel injection flow rate 54 $\dot{m}_{hc}$. However, in the GMC controller 38, the PI controller 34 does not output the manipulated variable (the DOC model 36 outputs the manipulated variable). The PI controller 34 outputs the required time derivative of the control variable $dT_{out}/dt$. The PI controller 34 specifies $dT_{out}/dt$ as follows:

$$\frac{dT_{out}}{dt} = K_1(T_{out}^* - T_{out}) + K_2 \int (T_{out}^* - T_{out}) dt \quad (3)$$

where the term $K_1(T_{out}^* - T_{out})$ specifies that when the DOC outlet 14b temperature $T_{out}$ deviates from the target temperature 40 $T_{out}^*$, the fuel injector 20 should be controlled such that $T_{out}^*$ is approached as specified by $dT_{out}/dt = K_1(T_{out}^* - T_{out})$. The term $K_2 \int (T_{out}^* - T_{out}) dt$ specifies that the change of $dT_{out}/dt$ should bring the DOC outlet 14b temperature $T_{out}$ close to a zero offset. It is to be appreciated that values for $K_1$ and $K_2$ can be determined based on the desired operating performance of the PI controller 34. For example, values for $K_1$ and $K_2$ can be determined based on a desired shape (e.g., temperature overshoot amount) and speed of the exhaust system process response.

As stated above, the PI controller 34 calculates $dT_{out}/dt$ and outputs $dT_{out}/dt$ to the DOC model 36. The DOC model 36 models a portion of the exhaust system 10, such as the DOC 14, and controls the operation of the fuel injector 20 based on the $dT_{out}/dt$ signal received from the PI controller 34. Conventional methodologies for controlling the temperature and THC slip of the exhaust stream 30 generally involve open-loop control, which are either difficult for calibration or limited in accuracy. One control alternative can be the DOC model 36. The DOC model 36 considers both catalyst kinetics and mass transfer limitations, and takes account for the degradation of DOC 14 as well. The DOC model 36 can provide a conversion efficiency prediction on the full operation range and full lifetime of the DOC 14, and thus, improve the controller 12 performance. As compared to known conventional methods, the DOC model 36 and the THC slip controller 50 can provide an accurate THC slip prediction for the on-board diagnostics, which can be used for controlling THC slip during light-off and peak flow conditions. The THC slip control scheme can be useful for applications when there is no catalyst used downstream of DOC 14, thus all the THC slip emits from the tailpipe 32.

The DOC model 36 is provided based on the CSTR model and can further include a plurality of parameters, such as the THC conversion efficiency $\eta$, the mass transfer rate constant $k_m$, the kinetics rate constant $k_r$, the THC slip Slip, and the limiting THC slip $Slip_{lim}$.

With a CSTR model, the THC conversion efficiency $\eta$ can be derived, in standard temperature and pressure format, in the following format:

$$-\ln(1-\eta) = \frac{1}{\frac{1}{k_m} + \frac{1}{k_r}} \quad (4)$$

with $$k_m = C_1(\dot{m}_{exh})^{mm}(T_o)^{nt} \quad (5)$$

and with $$k_r = C_2 \frac{P_g^{\alpha+1} y_{O2}^\alpha}{\dot{m}_{exh}} e^{-\frac{E_a}{RT_s}} \quad (6)$$

where $C_1$, $C_2$, n, m, t and $\alpha$ are constants, $T_0$ is a DOC 14 body temperature, $P_g$ is an exhaust gas pressure, $y_{O2}$ is a molar fraction, $E_a$ is an activation energy, R is gas constant, and $T_s$ is a solid temperature. The open-loop adjustment parameter determined in equation (1) may also be included in $C_2$ calculation in equation (6).

The analytic solution of equations (4-6) provides a convenient way to calibrate the kinetics and mass transfer parameters. The THC conversion efficiency $\eta$ derived from the equations is supplied as one of the plurality of parameters to the DOC model 36 for temperature control and THC slip control.

In example embodiments, methods further include a step of monitoring a plurality of conditions of the exhaust stream 30 in the DOC inlet 14a by one or more sensors 24, 26, 28 connected to the DOC model 36. The DOC inlet 14a conditions in the exhaust stream 30 include the oxygen concentration $C_{O2}$, mass flow rate $\dot{m}_{exh}$, and temperature $T_{in}$. The monitored conditions are sent to DOC model 36 and used for other steps.

In example embodiments, after monitoring the conditions, the controller 12 can utilize the DOC model 36 with the plurality of parameters and one or more DOC inlet 14a conditions to calculate the HC fuel injection flow rate 54 $\dot{m}_{hc}$ and control the operation of the fuel injector 20 and, therefore, the DOC outlet 14b temperature $T_{out}$.

In one example embodiment, the HC fuel injection flow rate 54 $\dot{m}_{hc}$ is the same as the post fuel injection flow rate 56 $\dot{m}_{pi}$. In this example embodiment, the method is for controlling the temperature of the exhaust system 10 instead of controlling the THC slip exiting the exhaust system 10.

A closed-form solution for the DOC model 36 can be determined based on the CSTR model of the DOC 14, to calculate the HC fuel injection flow rate 54 $\dot{m}_{hc}$ as follows:

$$\dot{m}_{hc} = \frac{3600 \times C_{p\_s} \times \text{Mass}_{DOC} \times \left(\frac{dT_{out}}{dt}\right) - }{\text{Model\_adj} \times (C_{p\_g} \times (T_{in} - T_{out}) + \Delta H \times \eta)} \quad (7)$$

where $C_{p\_s}$ and $C_{p\_g}$ are a substrate heat capacity of the DOC 14 and a gas heat capacity within the DOC 14, respectively, and they are functions of actual DOC temperature $T_{out}$. $\text{Mass}_{DOC}$ is the mass of the DOC 14; $dT_{out}/dt$ is the desired time derivative of the DOC outlet 14b temperature and is calculated according to equation (2); Model-adj is the closed-loop adjustment parameter; $\Delta H$ is the heat released from the reaction; and $\eta$ is the HC conversion efficiency as defined by equation (4-6) in the DOC model 36.

In another example embodiment, the HC fuel injection flow rate 54 $\dot{m}_{hc}$ is controlled by the limiting THC slip $\text{Slip}_{lim}$ in order to control the THC slip exiting the exhaust system 10 as well. In this embodiment, the method includes the step of calculating the post fuel injection flow rate 56 $\dot{m}_{pi}$ using the same equation (7) above. The method further includes calculating the limiting THC slip flow rate 58 $\dot{m}_{pi,lim}$ by the DOC model 36 and THC slip calculator 50b. The limiting THC slip flow rate 58 $\dot{m}_{pi,lim}$ is calculated using the following formula:

$$\dot{m}_{pi,lim} = \frac{\text{Slip}_{lim}}{1 - \eta} \quad (8)$$

where $\text{Slip}_{lim}$ is the limiting THC slip, $\dot{m}_{pi,lim}$ is the limiting THC slip flow rate 58, $\eta$ is the THC conversion efficiency. The THC conversion efficiency $\eta$ can be calculated by equations (4-6).

In this example embodiment, the method further includes a step of choosing the smaller value between the post fuel injection flow rate 56 $\dot{m}_{pi}$ and the limiting THC slip flow rate 58 $\dot{m}_{pi,lim}$ by the comparator 50a of the THC slip controller 50, and applying this value as the actual HC fuel injection flow rate 54 $\dot{m}_{hc}$ to control the operation of the fuel injector 20.

The method in the embodiment gives extremely accurate THC slip prediction for the full operation range of DOC 14. The THC slip can be predicted by the formula:

$$\text{Slip} = \dot{m}_{hc}(1-\eta) \quad (9)$$

where Slip is the THC slip, $\dot{m}_{hc}$ is the actual HC fuel injection flow rate 54, $\eta$ is the THC conversion efficiency.

This method with both kinetics and mass transfer calculations, works well both in mass-transfer-controlled regions (i.e. high flow condition) and kinetics-controlled regions (i.e. near lighted-off temperature). Thus, a protection strategy can be developed by calculating the limiting THC slip flow rate 58 $\dot{m}_{pi,lim}$ according to equation (8). The post fuel injection flow rate 56 $\dot{m}_{pi}$ is then limited by the limiting THC slip flow rate 58 $\dot{m}_{pi,lim}$. This is useful to regulate the THC slip coming out of DOC 14, especially for temperature near light-off and high-flow conditions. This also becomes helpful when a bare DPF 16 is used in the exhaust system 10 and THC slip has to be controlled using DOC 14 only.

In example embodiments, in addition to controlling the temperature and THC slip based on the DOC model 36, methods can further comprise the steps of determining an error in the DOC model 36 based on the monitored conditions and changing the DOC model 36 based on the open-loop adjustment parameter and the closed-loop adjustment parameter to reduce the error.

As discussed above, equation (1) includes the open-loop adjustment parameter while equation (7) includes the closed-loop adjustment parameter Model_adj. Therefore, the controller 12 can determine errors in its own process model and compensate for such errors by dynamically adjusting the model. For instance, the DOC model 36 compensates for major system disturbances caused by changing exhaust system conditions, for example, changing conditions that occur at the DOC inlet 14a.

Model_adj is updated dynamically based on a monitored condition or conditions of the exhaust system 10. In an example, the controller 12 updates a value for Model_adj with each control step. During each control step, the controller 12 determines a model mismatch $T_{out}$-$T_{out}$-$T_{out\_sim}$ between the observed DOC outlet 14b temperature $T_{out}$ and the estimated DOC outlet 14b temperature $T_{out}$-$T_{out\_sim}$. Using the difference between $T_{out}$ and $T_{out\_sim}$, and based on the one-step Newton iteration method, the controller 12 updates the value for Model_adj. The updated DOC model 36 with a new value for Model_adj is used to calculate/recalculate HC fuel injection flow rate 54 $\dot{m}_{hc}$.

It is to be appreciated that the estimated DOC outlet 14b temperature $T_{out\_sim}$ can have a different value than the target temperature 40 $T_{out}$. $T_{out\_sim}$ can be calculated as follows:

$$T_{out\_sim} = T_{out} + \frac{dT_{out}}{dt} \times \Delta t \quad (10)$$

where $dT_{out}/dt$ is the rate of change of the observed DOC outlet 14b temperature in one control interval, and $\Delta t$ is a time differential.

Having determined $T_{out\_sim}$, a value for Model-adj can be calculated as follows:

$$\text{Model\_adj} = \quad (11)$$
$$\text{Model\_adj\_old} + \frac{L \times 3600 \times C_{p\_s} \times \text{Mass}_{DOC} \times (T_{out} - T_{out\_sim})}{C_{p\_g} \times \dot{m}_{hc} \times (T_{in} - T_{out}) + \Delta H \times \dot{m}_{hc} \times \eta}$$

where L is an arbitrary constant coefficient for determining the speed or magnitude for updating Model_adj. Increasing the value for L will increase the degree to which Model_adj is changed with each control step. However, too large a value for L can cause undesired oscillation errors for $T_{out}$-$T_{out\_sim}$. It is to be appreciated that the new or updated value for Model_adj is calculated based on the existing value of the closed-loop adjustment parameter, Model_adj_old, which was determined and used as Model_adj during the previous control step.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of controlling a total hydrocarbon slip exiting an exhaust system including an oxidation catalyst, a particulate filter including an outlet, and a fuel injector for injecting fuel into an exhaust stream at a location upstream from the outlet of the particulate filter, the method comprising the steps of:

providing an oxidation catalyst model;
monitoring a condition of the exhaust stream;
calculating a post fuel injection flow rate;
calculating a limiting total hydrocarbon slip flow rate based on the oxidation catalyst model;
controlling an operation of the fuel injector at a hydrocarbon fuel injection flow rate based on a smaller one of the post fuel injection flow rate and the limiting total hydrocarbon slip flow rate, to control the total hydrocarbon slip exiting the exhaust system;
determining an error in the oxidation catalyst model based on the monitored condition; and
changing the oxidation catalyst model to reduce the error.

2. The method of claim 1, wherein the oxidation catalyst includes a diesel oxidation catalyst.

3. The method of claim 1, wherein the limiting total hydrocarbon slip flow rate is calculated based on a formula:

$$-\ln(1-\eta) = \frac{1}{\frac{1}{k_m} + \frac{1}{k_r}}$$

wherein $$\dot{m}_{pi,lim} = \frac{Slip_{lim}}{1-\eta}$$

wherein $k_m = C_1(\dot{m}_{exh})^{mm}(T_o)^{nt}$
and wherein $$k_r = C_2 \frac{P_g^{\alpha+1} y_{O_2}^{\alpha}}{\dot{m}_{exh}} e^{-\frac{E_a}{RT_s}}$$

where $Slip_{lim}$ is a limiting total hydrocarbon slip, $\dot{m}_{pi,lim}$ is the total limiting hydrocarbon slip flow rate, $\eta$ is a total hydrocarbon conversion efficiency, $k_m$ is a mass transfer rate constant, $k_r$ is a kinetics rate constant, in $\dot{m}_{exh}$ is a mass transfer rate in the exhaust stream, $C_1$, $C_2$, n, m, t and $\alpha$ are constants, $T_o$ is oxidation catalyst body temperature, $P_g$ is an exhaust gas pressure, $y_{O2}$ is a molar fraction, $E_a$ is an activation energy, R is gas constant, and $T_s$ is a solid temperature.

4. The method of claim 1, wherein the oxidation catalyst is provided in a catalytic converter that is located upstream from the particulate filter, and further wherein the catalytic converter has an outlet connected to the particulate filter and an inlet, the method further comprising the step of:
monitoring a plurality of catalytic converter inlet conditions including oxygen concentration in the exhaust stream, mass flow rate of the exhaust stream, and temperature of the exhaust stream,
wherein the post fuel injection flow rate is calculated based on at least one of the plurality of catalytic converter inlet conditions, and
wherein the fuel is injected into the exhaust stream at a location upstream from the catalytic converter.

5. The method of claim 1, wherein the monitored condition is the exhaust stream temperature at the point along the exhaust system, the method further comprising the steps of:
determining a target temperature for the point along the exhaust system;
calculating a difference between the target temperature for the point along the exhaust system and the exhaust stream temperature at the point along the exhaust system;
providing a controller including a proportional gain and an integral gain;
processing, by the controller, the calculated difference between the target temperature for the point along the exhaust system and the exhaust stream temperature at the point along the exhaust system, to determine a time derivative of the exhaust stream temperature at the point along the exhaust system; and
providing the time derivative to the oxidation catalyst model, wherein the time derivative is a parameter of the oxidation catalyst model.

6. The method of claim 1, the step of determining an error in the oxidation catalyst model further comprising steps of:
determining an expected temperature for the point along the exhaust system based on the oxidation catalyst model;
calculating a difference between the exhaust stream temperature at the point along the exhaust system and the expected temperature for the point along the exhaust system; and
determining the error in the oxidation catalyst model based on the difference between the exhaust stream temperature at the point along the exhaust system and the expected temperature for the point along the exhaust system.

7. The method of claim 1, wherein the step of changing the oxidation catalyst model is based on an open-loop adjustment parameter and a closed-loop adjustment parameter.

8. The method of claim 7, wherein the open-loop adjustment parameter is calculated based on a formula:

$$-\frac{dk}{dt} = Ak^b$$

where k is a reaction rate constant, t is time, and A and b are constants.

9. The method of claim 7, wherein the closed-loop adjustment parameter is calculated based on a formula:

$$Model\_adj = Model\_adj\_old + \frac{L \times 3600 \times C_{p\_s} \times Mass_{DOC} \times (T_{out} - T_{out\_sim})}{C_{p\_g} \times \dot{m}_{hc} \times (T_{in} - T_{out}) + \Delta H \times \dot{m}_{hc} \times \eta}$$

where Model_adj_old is an existing value of the closed-loop adjustment parameter during a previous control step, L is an arbitrary coefficient, $C_{p\_s}$ is a substrate heat capacity, $Mass_{DOC}$ is the mass of the oxidation catalyst, $T_{out}$ is the exhaust stream temperature at the point along the exhaust system, $T_{out\_sim}$ is an expected temperature for the point along the exhaust system, $C_{p\_g}$ is a gas heat capacity, $\dot{m}_{hc}$ is a fuel injection flow rate, $T_{in}$ is a temperature of the exhaust stream at an inlet of the oxidation catalyst, $\Delta H$ is a heat of a reaction, and $\eta$ is a total hydrocarbon conversion efficiency.

* * * * *